United States Patent
Stepp et al.

(10) Patent No.: US 11,521,053 B2
(45) Date of Patent: Dec. 6, 2022

(54) NETWORK COMPOSITION MODULE FOR A BAYESIAN NEUROMORPHIC COMPILER

(71) Applicant: HRL Laboratories, LLC, Malibu, CA (US)

(72) Inventors: Nigel D. Stepp, Santa Monica, CA (US); Aruna Jammalamadaka, Agoura Hills, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 473 days.

(21) Appl. No.: 16/792,791

(22) Filed: Feb. 17, 2020

(65) Prior Publication Data

US 2020/0184324 A1 Jun. 11, 2020

Related U.S. Application Data

(63) Continuation-in-part of application No. 16/294,886, filed on Mar. 6, 2019, now Pat. No. 11,288,572, and a continuation-in-part of application No. 16/294,815, filed on Mar. 6, 2019, now Pat. No. 10,748,063.

(60) Provisional application No. 62/814,091, filed on Mar. 5, 2019, provisional application No. 62/659,094, filed on Apr. 17, 2018, provisional application No. 62/659,085, filed on Apr. 17, 2018.

(51) Int. Cl.
  *G06N 3/063* (2006.01)
  *G06N 3/08* (2006.01)
  *G06N 3/04* (2006.01)

(52) U.S. Cl.
  CPC .......... *G06N 3/0635* (2013.01); *G06N 3/049* (2013.01); *G06N 3/0472* (2013.01); *G06N 3/08* (2013.01)

(58) Field of Classification Search
  None
  See application file for complete search history.

(56) References Cited

U.S. PATENT DOCUMENTS

| 9,189,730 | B1 | 11/2015 | Coenen et al. |
| 9,218,563 | B2 | 12/2015 | Szatmary et al. |
| 9,886,663 | B2 | 2/2018 | Sarah et al. |
| 2015/0074026 | A1 | 3/2015 | Szatmary et al. |

(Continued)

OTHER PUBLICATIONS

Notification of and the International Preliminary Report on Patentability Chapter II for PCT/US2020/018528; dated Feb. 10, 2021.

(Continued)

*Primary Examiner* — Vincent Gonzales
(74) *Attorney, Agent, or Firm* — Tope-McKay & Associates

(57) ABSTRACT

Described is a system for specifying control of a device based on a Bayesian network model. The system includes a Bayesian neuromorphic compiler having a network composition module having probabilistic computation units (PCUs) arranged in a hierarchical composition containing multi-level dependencies. The Bayesian neuromorphic compiler receives a Bayesian network model as input and produces a spiking neural network topology and configuration that implements the Bayesian network model. The network composition module learns conditional probabilities of the Bayesian network model. The system computes a conditional probability and controls a device based on the computed conditional probability.

15 Claims, 12 Drawing Sheets

(56) References Cited

U.S. PATENT DOCUMENTS

| | | | |
|---|---|---|---|
| 2015/0242745 A1* | 8/2015 | Wang | G06N 3/049 706/25 |
| 2018/0075345 A1 | 3/2018 | Gottfried et al. | |
| 2020/0342321 A1* | 10/2020 | Paul | G06N 7/005 |

OTHER PUBLICATIONS

B. Cai, L. Huang, and M. Xie. Bayesian networks in fault diagnosis. IEEE Transactions on Industrial Informatics, 13(5): pp. 2227-2240, 2017.

J. M. Cruz-Albrecht, T. Derosier, and N. Srinivasa. A scalable neural chip with synaptic electronics using cmos integrated memristors. Nanotech- nology, 24(38):384011, 2013, pp. 1-11.

D. Pecevski and W. Maass. Learning probabilistic inference through stdp. eneuro, pp. ENEURO-0048, 2016, pp. 1-34.

D. Tran, A. Kucukelbir, A. B. Dieng, M. Rudolph, D. Liang, and D. M. Biei. Edward: A library for probabilistic modeling, inference, and criticism arXiv preprint arXiv: 1610.09787, 2016, pp. 1-33.

Notification of Transmittal of International Search Report and the Written Opinion of the International Searching Authority for PCT/US2019/021056; dated Jun. 21, 2019.

International Search Report of the International Searching Authority for PCT/US2019/021056; dated Jun. 21, 2019.

Written Opinion of the International Searching Authority for PCT/US2019/021056; dated Jun. 21, 2019.

Qiuwen Chen et al., 'Real-time anomaly detection for streaming data using burst code on a neurosynaptic processor'. Design, Automation & Test in Europe Conference & Exhibition, 2017.

Amirhossein Tavanaei et al., 'Training a Hidden Markov Model with a Bayesian Spiking Neural Network', Journal of Signal Processing Systems, vol. 90, Issue 2, pp. 211-220, Feb. 2018.

J. Bill, L. Buesing, S. Habenschuss, B. Nessler, W. Maass, and R. Legenstein. Distributed bayesian computation and self-organized learning in sheets of spiking neurons with local lateral inhibition. PloS one, 10(8):e0134356, 2015, pp. 1-51.

Song et al., "Competitive Hebbian Learning through Spike-Timing-Dependent Synaptic Plasticity" in Nature Neuroscience 3, pp. 919-926.

Subutai Ahmad et al. 'Real-Time Anomaly Detection for Streaming Analytics', arXiv:1607.02480v1, Jul. 8, 2016.

Andrew S. Cassidy et al. 'TrueNorth: a High-Performance, Low-Power Neurosynaptic Processor for Multi-Sensory Perception, Action, and Cognition', Technical Report, IBM ResearchAlmaden Research Center San Jose United States, 2016.

Notification of Transmittal of International Search Report and the Written Opinion of the International Searching Authority for PCT/US2019/021049; dated Jun. 21, 2019.

International Search Report of the International Searching Authority for PCT/US2019/021049; dated Jun. 21, 2019.

Written Opinion of the International Searching Authority for PCT/US2019/021049; dated Jun. 21, 2019.

Notice of Allowance for U.S. Appl. No. 16/294,815, dated Apr. 16, 2020.

A. Sarajedini, et al., "Conditional probability density function estimation with sigmoidal neural networks," IEEE Trans. on Neural Networks, vol. 10, No. 2, Mar. 1999, pp. 231-238 (Year: 1999).

Notification of Transmittal, the International Search Report, and the Written Opinion of the International Searching Authority for PCT/US2020/018528; dated Jul. 2, 2020.

Nigel Stepp et al: "A Dynamical Systems Approach to Neuromorphic Computation of Conditional Probabilities", Proceedings of the International Conference on Neuromorphic Systems, Icons '18 , vol. 4, Jul. 23, 2018 (Jul. 23, 2018), pp. 1-4, XP055651552, New York, New York, USA.

Yu Zhaofei et al: "Implementation of Bayesian Inference In Distributed Neural Networks", 2018 26TH Euromicro International Conference on Parallel, Distributed and Network-Based Processing (PDP), IEEE, Mar. 21, 2018 (Mar. 21, 2018), pp. 666-673, XP033353802.

Guo Shangqi et al.: "Hierarchical Bayesian Inference and Learning in Spiking Neural Networks", IEEE Transactions on Cybernetics, IEEE, Piscataway, NJ, USA, vol. 49, No. 1, Jan. 1, 2019 (Jan. 1, 2019), pp. 133-145, XP011700733.

Rajesh P N Rao: "Hierarchical Bayesian Inference in Networks of Spiking Neurons", Jan. 1, 2005 (Jan. 1, 2005), XP055704175, Retrieved from the Internet: URL: https://www.ece.uvic.ca/bctill/papers/mocap/Rao_2005a.pdf, abstract section 1.

* cited by examiner

NETWORK COMPOSITION MODULE FOR A BAYESIAN NEUROMORPHIC COMPILER

CROSS-REFERENCE TO RELATED APPLICATIONS

The present application is a Continuation-in-Part application of U.S. application Ser. No. 16/294,886, filed in the United States on Mar. 6, 2019, entitled, "Programming Model for a Bayesian Neuromorphic Compiler," which is a Non-Provisional Application of U.S. Provisional Application No. 62/659,085, filed in the United States on Apr. 17, 2018, entitled, "A Neuronal Network Topology for Computing Conditional Probabilities," and U.S. Provisional Application No. 62/659,094, filed in the United States on Apr. 17, 2018, entitled, "Programming model for a Bayesian Neuromorphic Compiler," the entirety of which are incorporated herein by reference.

The present application is ALSO a Continuation-in-Part application of U.S. application Ser. No. 16/294,815, filed in the United States on Mar. 6, 2019, entitled, "A Neuronal Network Topology for Computing Conditional Probabilities," which is a Non-Provisional Application of U.S. Provisional Application No. 62/659,085, filed in the United States on Apr. 17, 2018, entitled, "A Neuronal Network Topology for Computing Conditional Probabilities," the entirety of which are incorporated herein by reference.

The present application is ALSO a Non-Provisional Application of U.S. Provisional Application No. 62/814,091, filed in the United States on Mar. 5, 2019, entitled, "Network Composition Module for a Bayesian Neuromorphic Compiler," the entirety of which is incorporated herein by reference.

BACKGROUND OF INVENTION

(1) Field of Invention

The present invention relates to a system for automatically translating Bayesian network models into neuromorphic computing models and, more particularly, to a system for automatically translating Bayesian network models into neuromorphic computing models using a Bayesian Neuromorphic Compiler.

(2) Description of Related Art

A Bayesian network is a probabilistic graphical model that represents a set of variables and their conditional dependencies via a directed acyclic graph (DAG). Bayesian probability theory has emerged as a framework for describing perception, reasoning, and learning of mammals.

There are existing systems that create a high-level language for specifying Bayesian models, but they target conventional computing hardware, such as a general purpose central processing units (CPU) or graphics processing units (GPU). A group at Graz University is working on theoretical mappings between Bayesian inference algorithms and neuronal dynamics; however, their most recent work (Pecevski and Maass, "Learning probabilistic inference through spike-timing-dependent plasticity", eNeuro 25 Mar. 2016, 3(2) E0048-15.2016 1-35; hereinafter referred to as Pecevski and Maass), which is hereby incorporated by reference as though fully set forth herein, utilizes population coded static distributions, and has not been shown to work for non-stationary relationships between random variables. The work of Pecevski and Maass requires careful manual specification of the neuronal network structure, which then only applies to very specific datasets or use-cases.

Thus, a continuing need exists for a programming model that automatically translates Bayesian network models into neuromorphic computing models for enabling users who are not familiar with neuronal properties to leverage neural computations.

SUMMARY OF INVENTION

The present invention relates to a system for automatically translating Bayesian network models into neuromorphic computing models, and more particularly, to a system for automatically translating Bayesian network models into neuromorphic computing models using a Bayesian Neuromorphic Compiler and specifying control of a device based on the Bayesian network models. The system comprises a Bayesian neuromorphic compiler, having a network composition module comprising a plurality of probabilistic computation units (PCUs) arranged in a hierarchical composition containing multi-level dependencies, embodied on a non-transitory computer-readable medium. The Bayesian neuromorphic compiler receives a Bayesian network model as input; produces a spiking neural network topology and configuration that implements the Bayesian network model; learns conditional probabilities of the Bayesian network model using the network composition module; computes at least one conditional probability; and controls a device based on the at least one computed conditional probability.

In another aspect, controlling the device includes causing the device to perform a maneuvering operation based on the at least one computed conditional probability.

In another aspect, the PCUs are neuromorphic computing circuits configured to compute conditional probabilities.

In another aspect, the network composition module arranges the plurality of PCUs such that it learns the conditional probabilities of the Bayesian network model and, subsequently, infers at least one conditional probability pertaining to a query for the Bayesian network model.

In another aspect, the device is an autonomous mobile platform, and the maneuvering operation is a collision avoidance operation.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
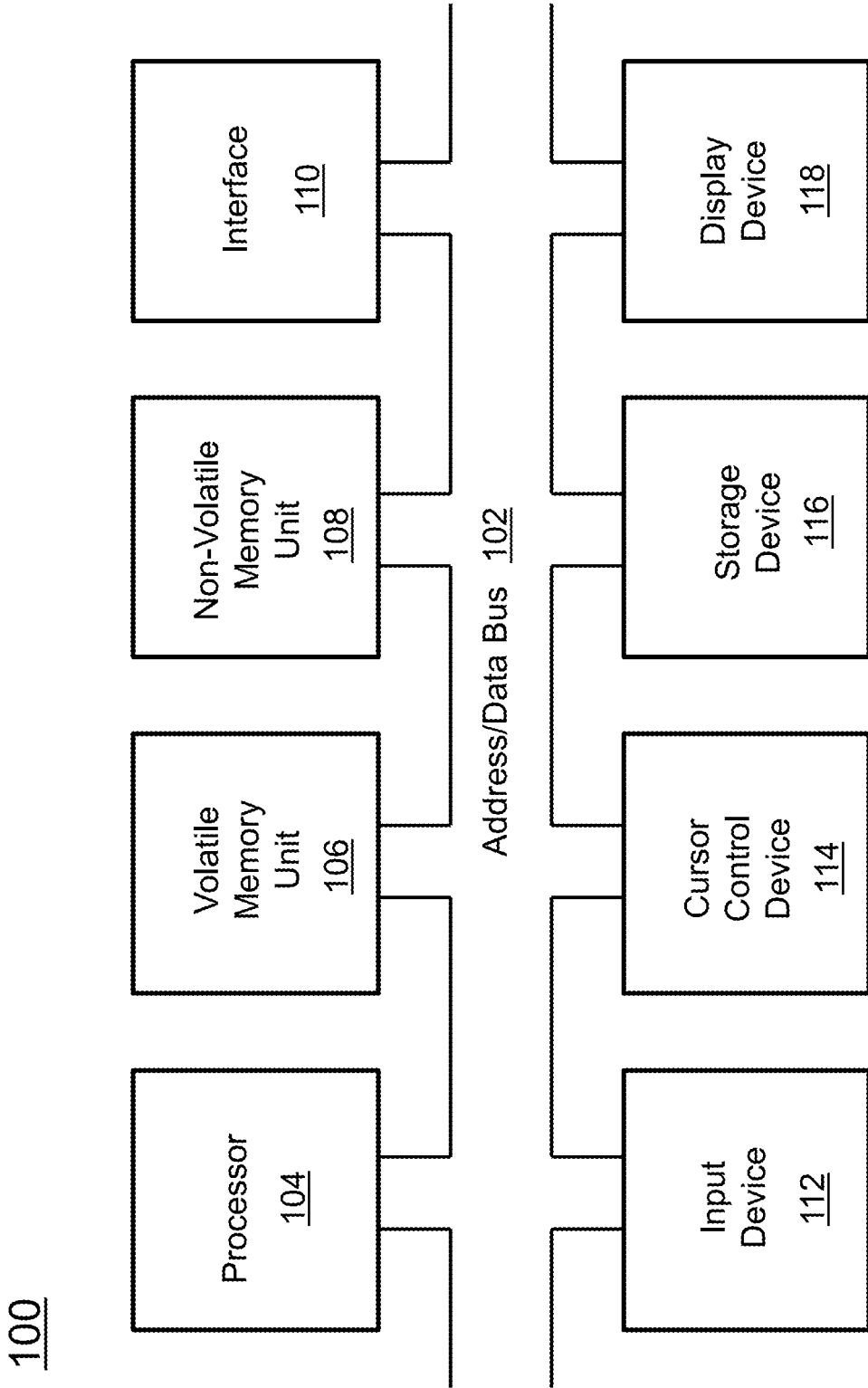
FIG. 1 is a block diagram depicting the components of a system for automatically translating Bayesian network models into neuromorphic computing models according to some embodiments of the present disclosure.

The present invention relates to a system for automatically translating Bayesian network models into neuromorphic computing models, and more particularly, to a system for automatically translating Bayesian network models into neuromorphic computing models using a Bayesian Neuromorphic Compiler. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

(1) Principal Aspects

Various embodiments of the invention include three "principal" aspects. The first is a system for automatically translating Bayesian network models into neuromorphic computing models. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), a field programmable gate array (FPGA), a general purpose neuromorphic processor, and a processor composed of Probabilistic Computation Units (PCUs) in ASIC form (i.e., a PCU-dedicated processor).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 104. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 104. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
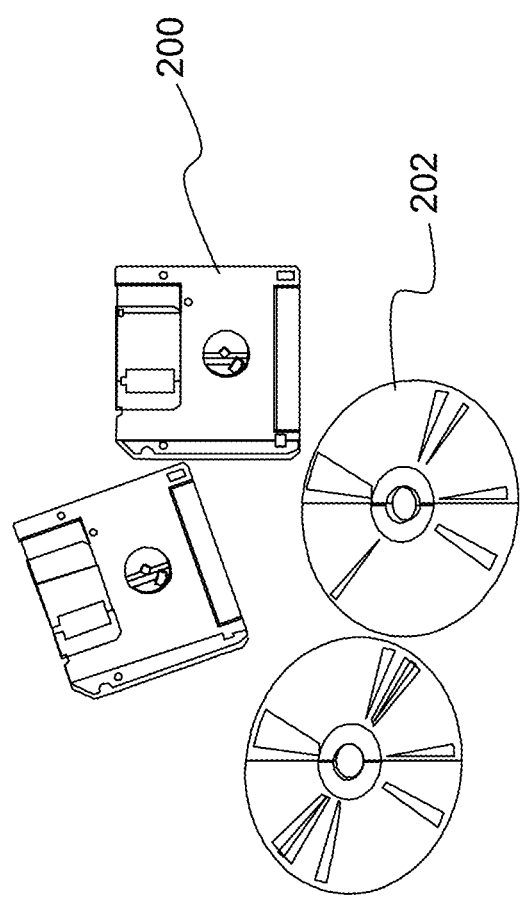
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(2) Specific Details of Various Embodiments

Described is a Bayesian Neuromorphic Compiler (BNC) that takes as input a Bayesian network model, or particular computation thereon, and produces a spiking neural network topology and configuration that implements that model or computation. The programming model for the BNC was defined in U.S. application Ser. No. 16/294,886, which is hereby incorporated by reference as though fully set forth herein. In the present disclosure, a new module for the BNC is described, which is able to chain components of Probabilistic Computation Units or "PCUs" to perform learning and inference for any directed, acyclic Bayesian Network model. A user may specify such a Bayesian network model via the programming model (as described in U.S. application Ser. No. 16/294,886), and the network composition module, which is a part of the neuromorphic compiler, will combine PCU components in such a way that it learns the conditional probabilities of that model and is, subsequently, able to readout ("infer") probabilities pertaining to any valid query for that Bayesian network.

The invention described herein enables an end-user who is skilled in the art of constructing Bayesian network models to take advantage of particular spiking neural networks that perform Bayesian computations. There are existing high-level programming languages for specifying Bayesian models, such as described by Tran et al. in "Edward: A Library for Probabilistic Modeling, Inference, and Criticism," 2016, arXiv:1610.09787, which is hereby incorporated by reference as though fully set forth herein. However, existing high-level programming languages target conventional computing hardware, such as a general purpose central processing unit (CPU) or graphics processing unit (GPU). By targeting the special purpose spiking neuronal network, the user may compute more efficiently and at a larger scale. The invention, in conjunction with the programming model described in U.S. application Ser. No. 16/294,886 allows the user to do so without knowledge of the details of the underlying neuronal network.

Figure 3A:
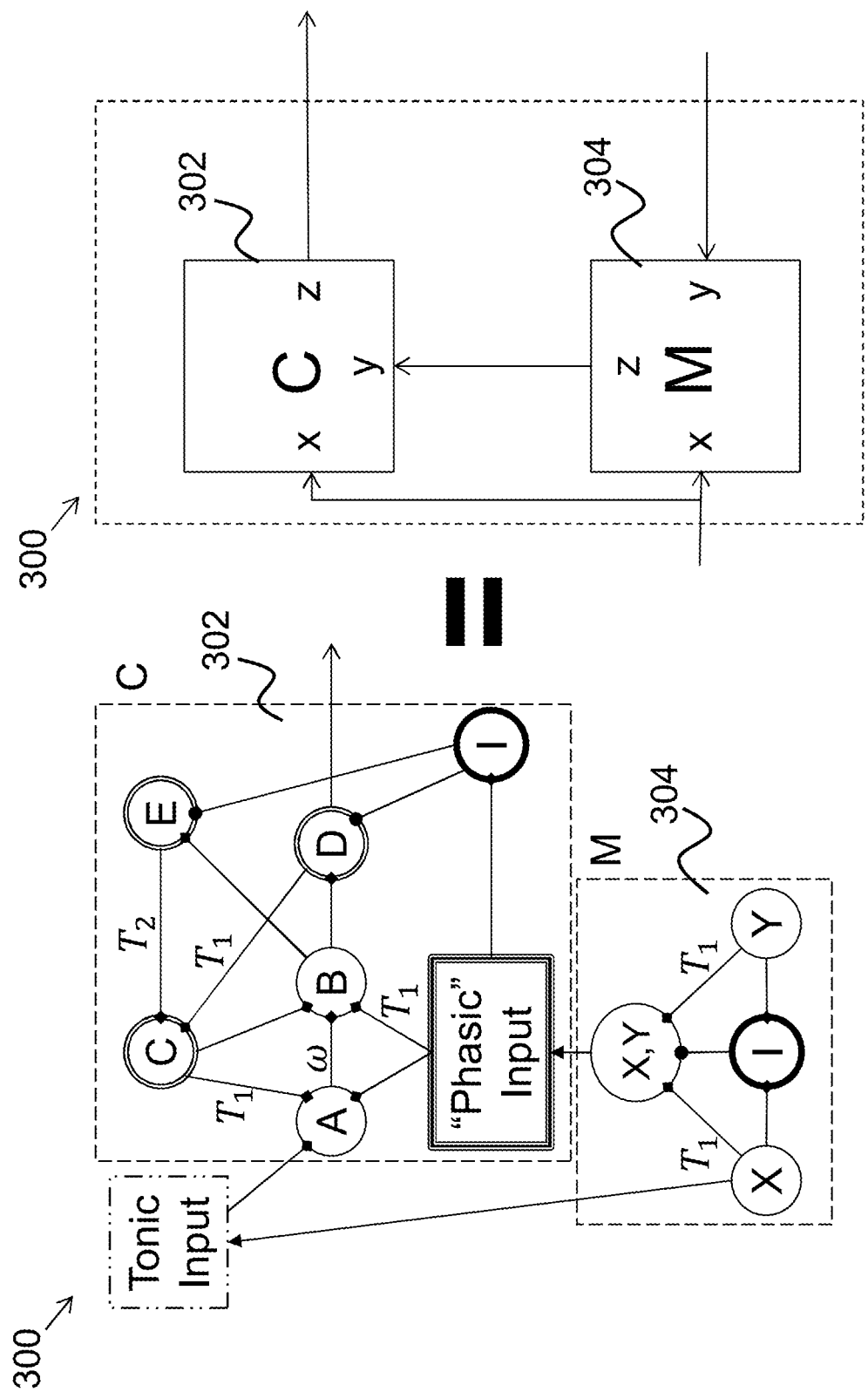
FIG. 3A is an illustration of a probabilistic computation unit (PCU) that can be decomposed into C and M subunits according to some embodiments of the present disclosure.
Figure 3B:
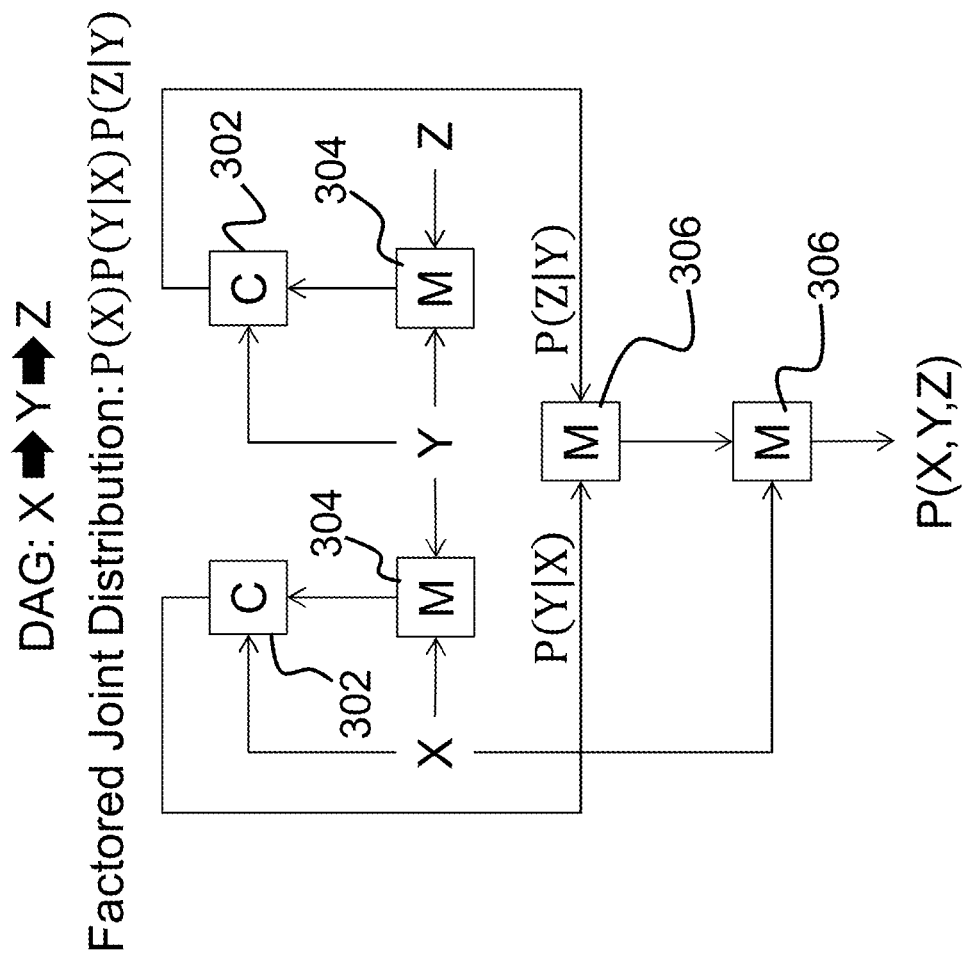
FIG. 3B is an illustration of C and M subunits re-composed according to some embodiments of the present disclosure.

This invention consists of system and method for creating hierarchical compositions of PCUs, which are neuromorphic computing circuits designed to compute conditional probabilities. As described above, this invention is an extension of a previous description of a PCU-based programming model described in U.S. application Ser. No. 16/294,886. The PCU itself, with the C and M subunits, are illustrated in FIGS. 3A and 3B. FIG. 3A depicts the PCU (element 300), which can be further decomposed into a C subunit (element 302) and a M subunit (element 304). FIG. 3B shows the C subunit (element 302) and M subunit (element 304) re-composed to implement the learning and computation of arbitrary conditional factorings. It is assumed that an underlying probabilistic model consists of a Directed Acyclic Graph (DAG), where arrows correspond to conditional dependence between model variables. Hierarchical composition, in this case, reflects that such a model can contain multi-level dependencies, as opposed to a completely flat model, where the PCUs are dependent on one another in the sense that the output of one PCU acts as input into another PCU.

(2.1) Composition of Probabilistic Computation Units

Each learning neuronal network consists of at least one PCU for each conditional probability. A PCU is also referred to as a C-M unit, where C refers to a convergence unit and M denotes a multiplier unit (i.e., logical AND). The learning neuronal network consists of some number of PCUs (C-M) connected by additional M units for computing joint probabilities of binary variables depending on the computation being performed (and as specified by the pseudocode described below). FIG. 3A depicts a single PCU (element 300) comprising a C-M unit (elements 302 and 304, respectively), which computes the conditional probability of two variables. FIG. 3B depicts computation of the joint probability of three variables P(X,Y,Z), which is the probability that X, Y, and Z will spike together. In FIG. 3B, the learning neuronal network comprises an additional M unit (element 306) for computing joint probabilities of binary variables. As stated above, the learning neuronal network refers to either a single PCU or the composition of PCUs.

Figures 4A, 4B:
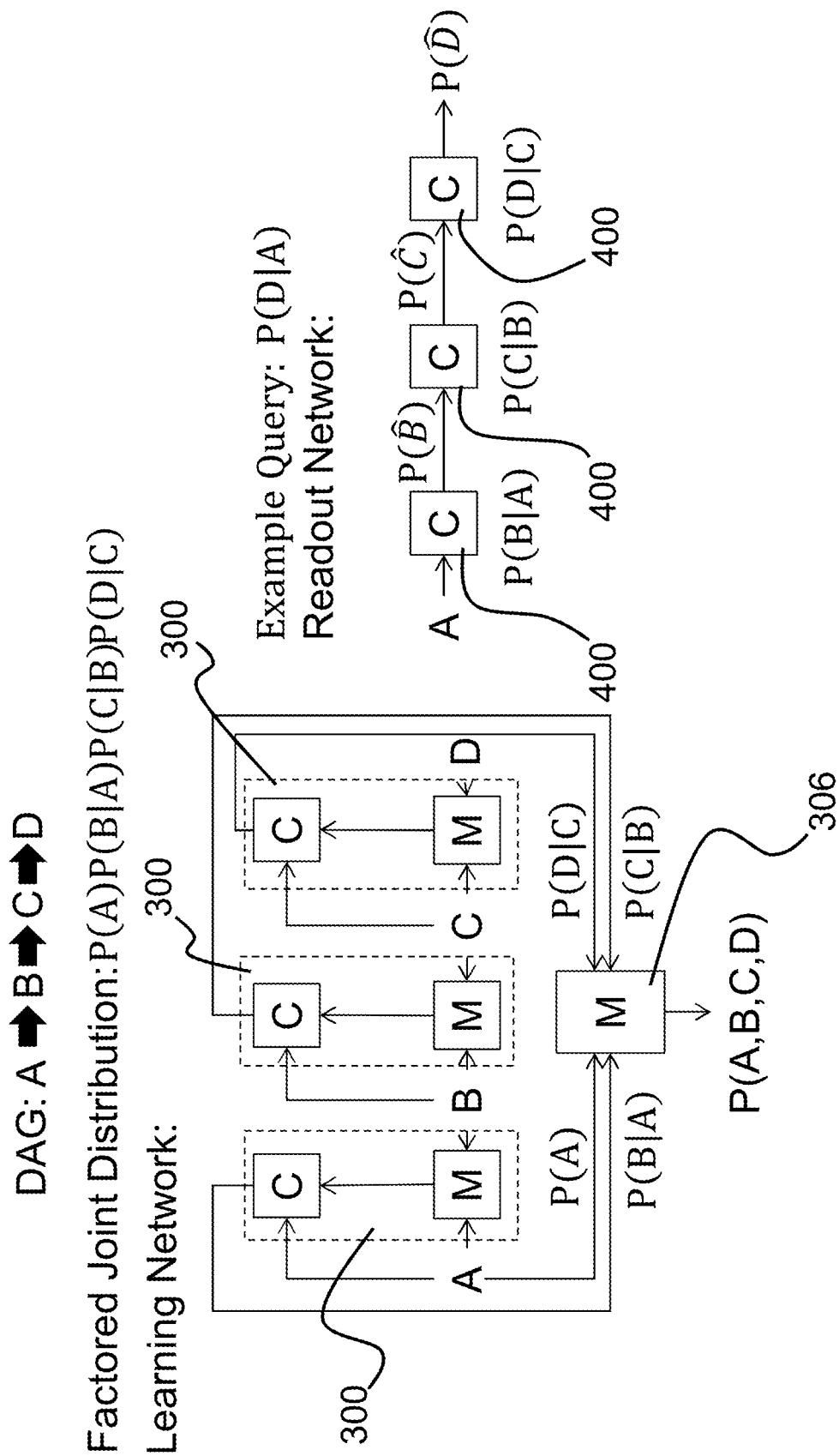
FIG. 4A is an illustration of a chain-like model composed as a simple chain of PCUs according to some embodiments of the present disclosure.
FIG. 4B is an illustration of computation of P(D|A) using learned models to stand in for observed variables according to some embodiments of the present disclosure.
Figure 10:
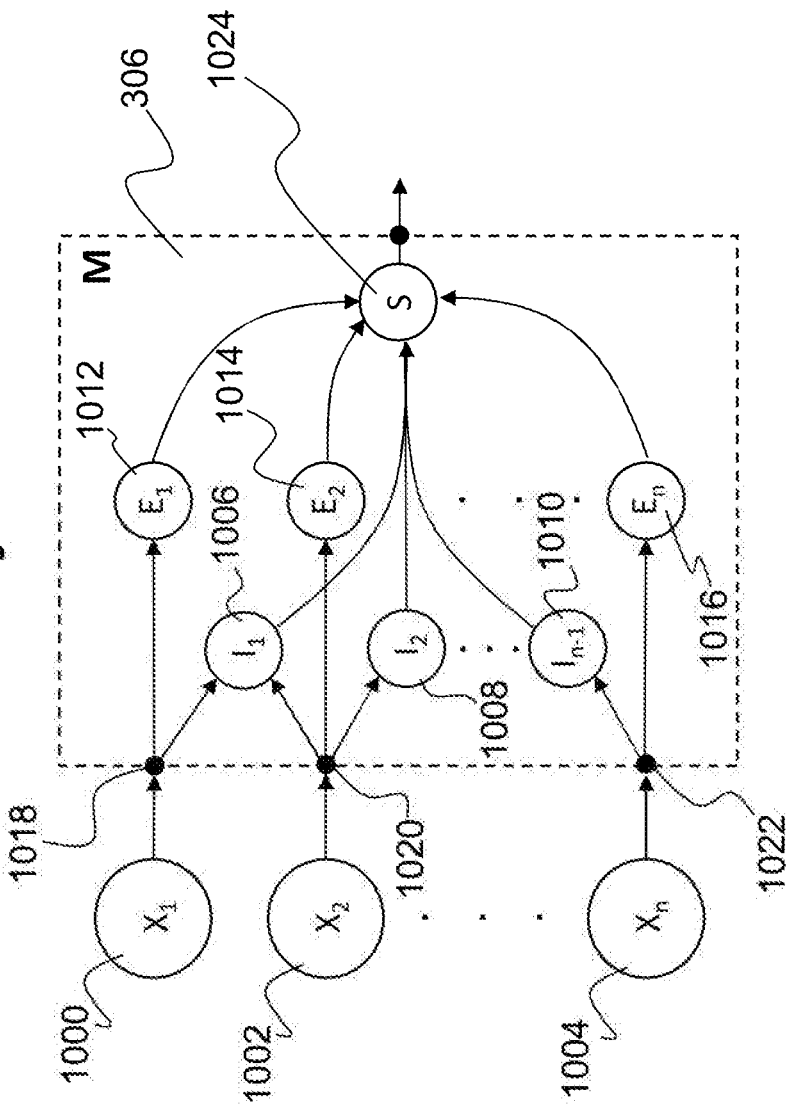
FIG. 10 is an illustration of a spiking network for an N-ary AND according to some embodiments of the present disclosure.

FIG. 4A illustrates a chain-like model composed as a simple chain of PCUs (element 300), where the additional M unit (element 306) should be considered an N-ary AND. The spiking network for the N-ary AND is depicted in FIG. 10. For each additional input (elements 1000, 1002, and 1004) included in the M unit (element 306), one inhibitory connection (I) (elements 1006, 1008, and 1010 and one excitatory connection (E) (elements 1012, 1014, and 1016) is added. In addition, a synapse (elements 1018, 1020, and 1022) from each new input is added to the new neuron, S (element 1024). An additional synapse from the previous input to the new inhibitory neuron is also added. FIG. 4B depicts computation of P(D|A), using learned models to stand in for observed variables. In a second readout (inference) mode, the neuronal network consists of only synaptic weights from learned C subunits (element 302), as shown in FIG. 4B. For instance, given a simple chain topology as an underlying model, FIGS. 4A and 4B illustrate how such a model can be learned and, subsequently, used for inference.

Figures 5A, 5B:
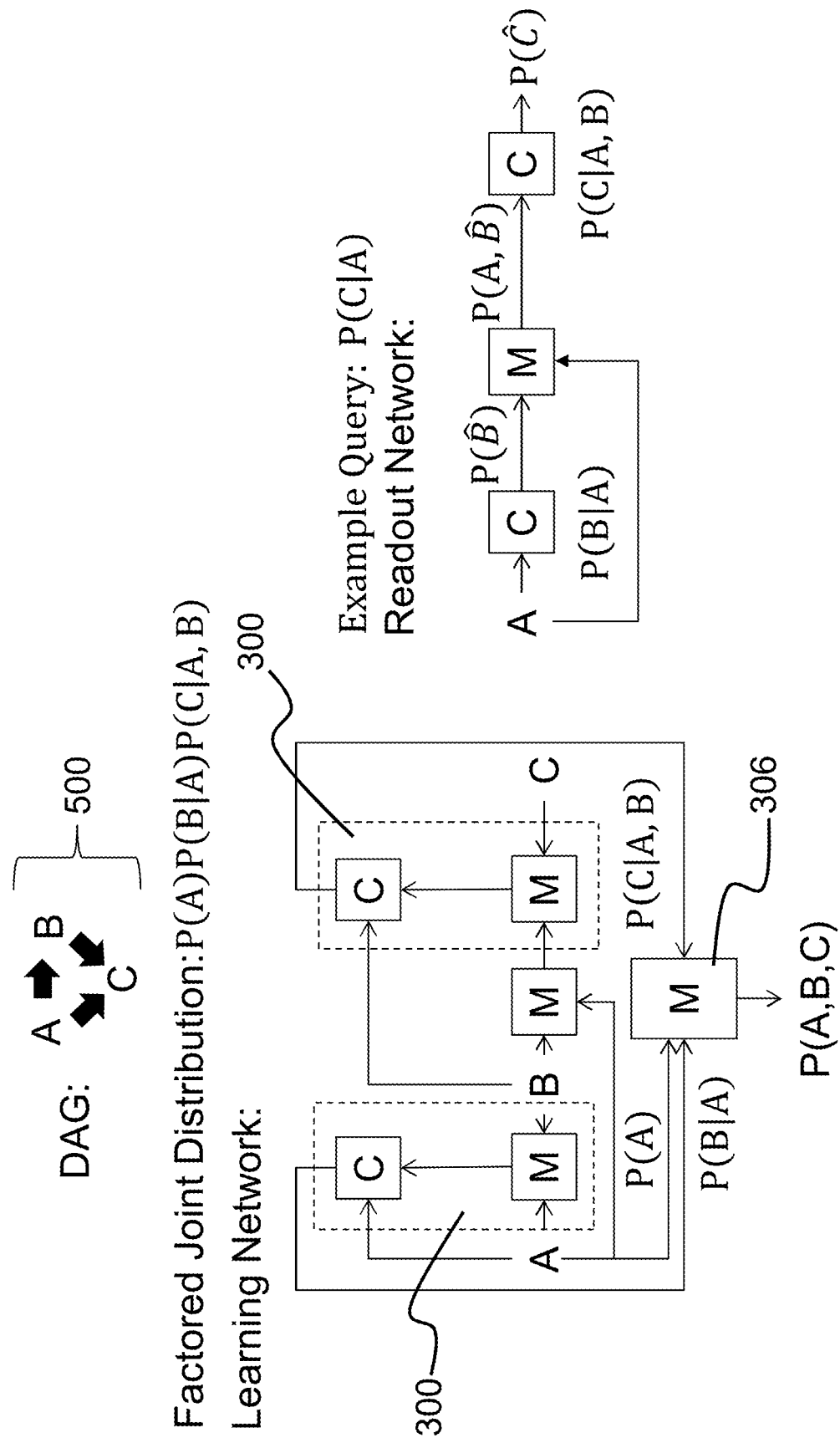
FIG. 5A is an illustration of a triangle-shaped model corresponding to a mediating or moderating cause according to some embodiments of the present disclosure.
FIG. 5B is an illustration of computation which requires input from multiple learned models according to some embodiments of the present disclosure.

As a first step towards hierarchy, FIGS. 5A and 5B show the required setup for a mediating situation (A causes C, but A also causes B, which causes C). Specifically, FIG. 5A depicts a triangle-shaped model corresponding to a mediating or moderating cause. FIG. 5B illustrates computation which requires input from multiple learned models. P(C|A, B) is the probability that variable/event C happens given that events A and B happen. $P(A, \hat{B})$ is the probability that events A and B happen at the same time, using the estimated probability of B. The "hat" notation indicates that the probability is estimated by the system.

Figure 6A:
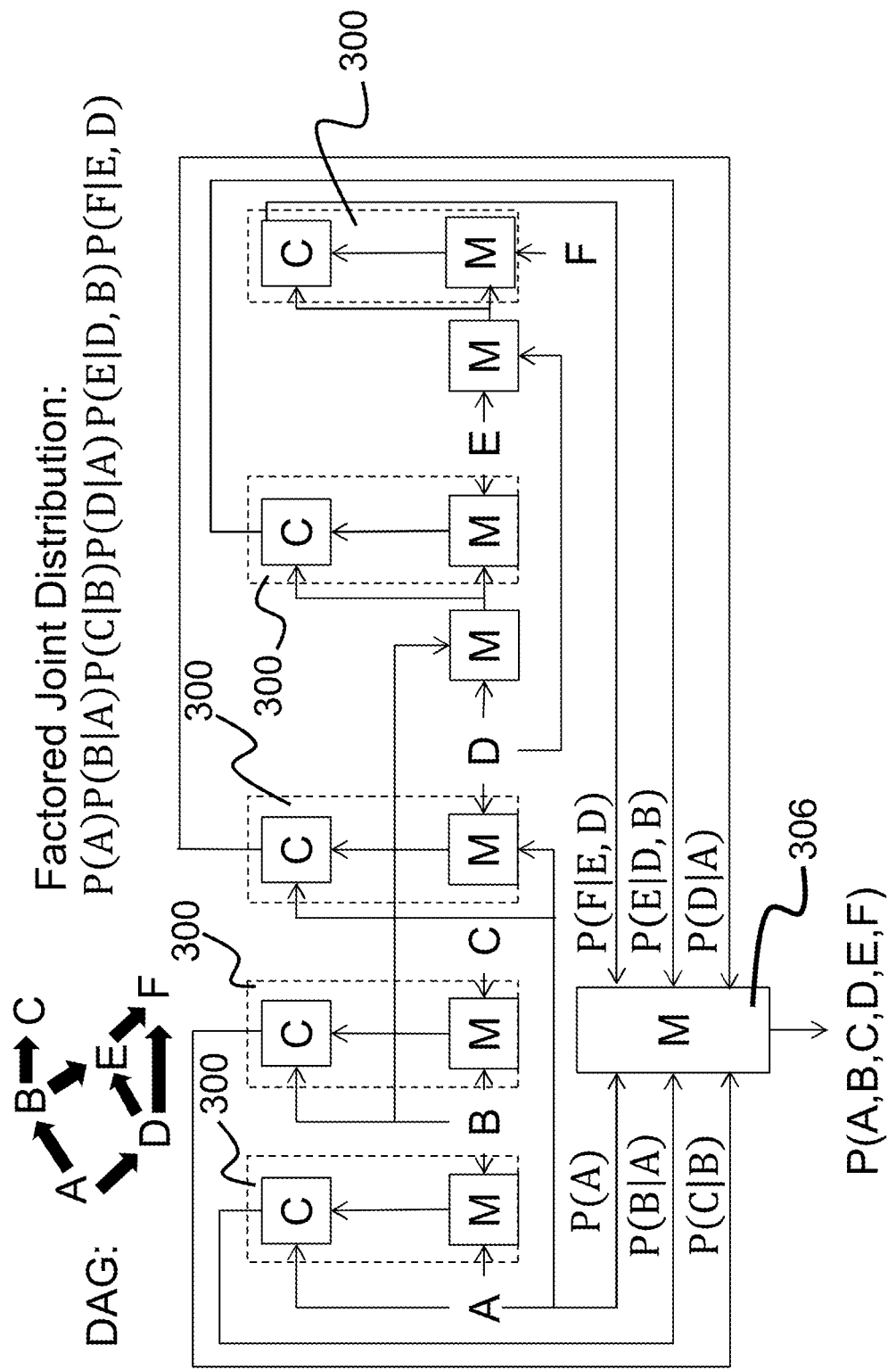
FIG. 6A is an illustration depicting a process according to some embodiments of the present disclosure as applied to arbitrary directed acyclic graphs (DAGs)
Figure 6B:
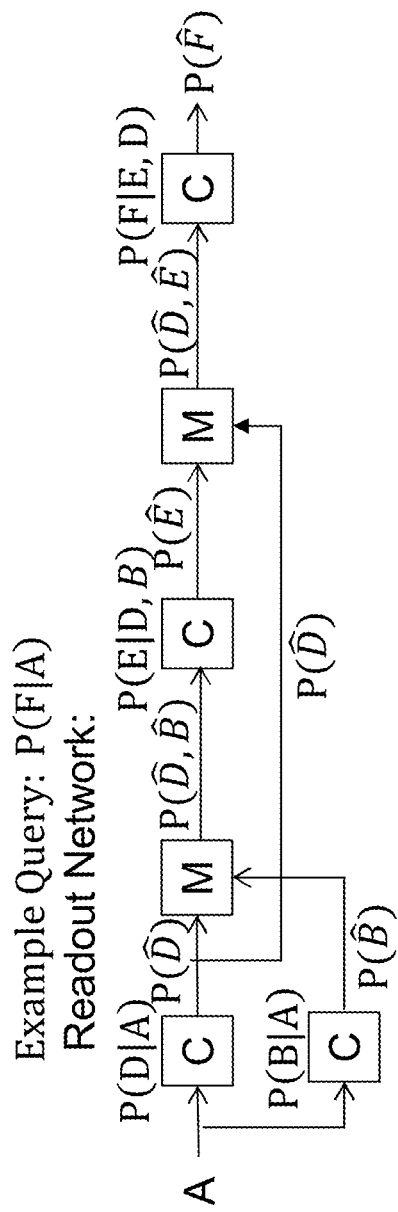
FIG. 6B is an illustration of a readout network for computation of P(F|A) according to some embodiments of the present disclosure.

Finally, FIG. 6A shows a non-trivial model with the corresponding decomposition into a combination of C and M subunits, or PCUs (element 300). FIG. 6B illustrates the readout network for computing P(F|A). In general, such circuits may be generated using the following grammar and construction algorithm, as would be understood by one skilled in the art. Backus-Naur Form (BNF) is a notation technique for context-free grammars used to describe the syntax of languages used in computing.

```
⟨computation⟩ ::= ⟨conditional_list⟩
⟨conditional_list⟩ ::= ⟨conditional⟩⟨conditional_list⟩
   | ⟨empty⟩
⟨conditional⟩ ::= ⟨var⟩ '|' ⟨var⟩⟨var_list⟩
⟨var_list⟩ ::= ',' ⟨var⟩⟨var_list⟩
   | ⟨empty⟩
Net ← Ø
Last ← Ø
for conditional(x, ys) in computation do
    A ← lookup(Net, x)
    if A = Ø then
        A ← NewVar(Ney, x)
    end if
    Y ← Ø
    for y in ys do
        B ← lookup(Net, y)
        if B = Ø then
            B ← NewVar(Net, y)
        end if
        Y ← M(Y, B)
    end for
    This ← C(Y, M(A, Y))
    if Last ≠ Ø then
        Last ← M(Last, This)
    else
        Last ← This
    end if
end for
LearnNet ← Last
```

The algorithm for taking the learned C units and constructing a readout network is detailed below.

```
(x, y) ← query
A ← lookup(Net, x)
B ← lookup(Net, y)
fun walk_conditional(A,B)
    conditionals ← Ø
    for y in parents(A) do
        if y = B then
            conditionals → conditionals ∪ {y}
        else
            conditionals → conditionals ∪ {walk_conditional(y, B)}
        end if
    end for
    MultComposition ← fold(λm, v. Mult(m, v), conditionals)
    cond ← lookup_cond(LearnNet, P(A\parents(A))
    cond(X, Y) → cond(MultComposition, Ø)
    return cond
```

```
end fun
readout ← walk_conditional(A, B)
```

Figures 7A, 7B:
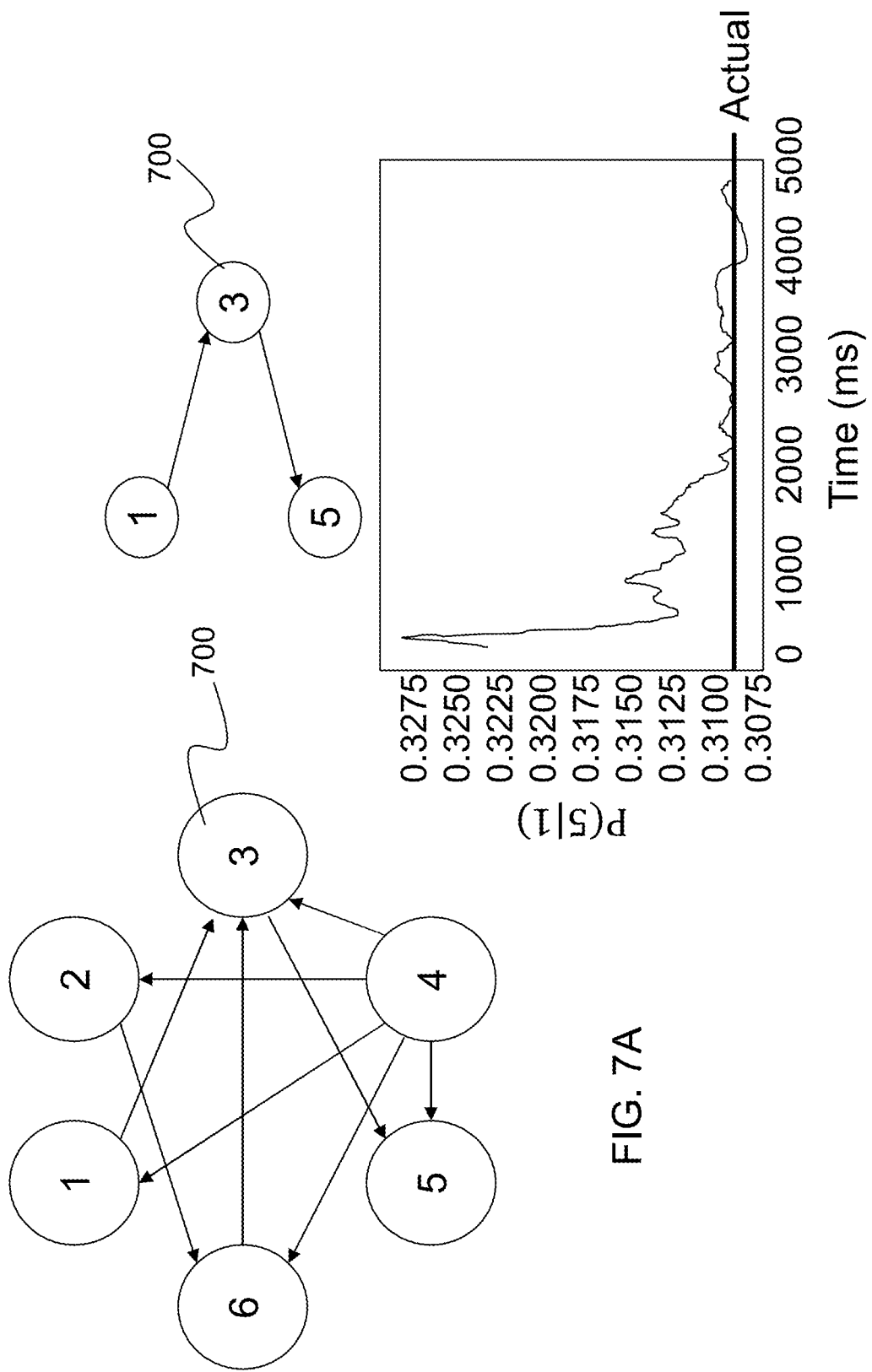
FIG. 7A is an illustration of an underlying model learned from six simulated random variables according to some embodiments of the present disclosure.
FIG. 7B is an illustration of results from computation of a path in the model shown in FIG. 7A according to some embodiments of the present disclosure.
Figure 8:
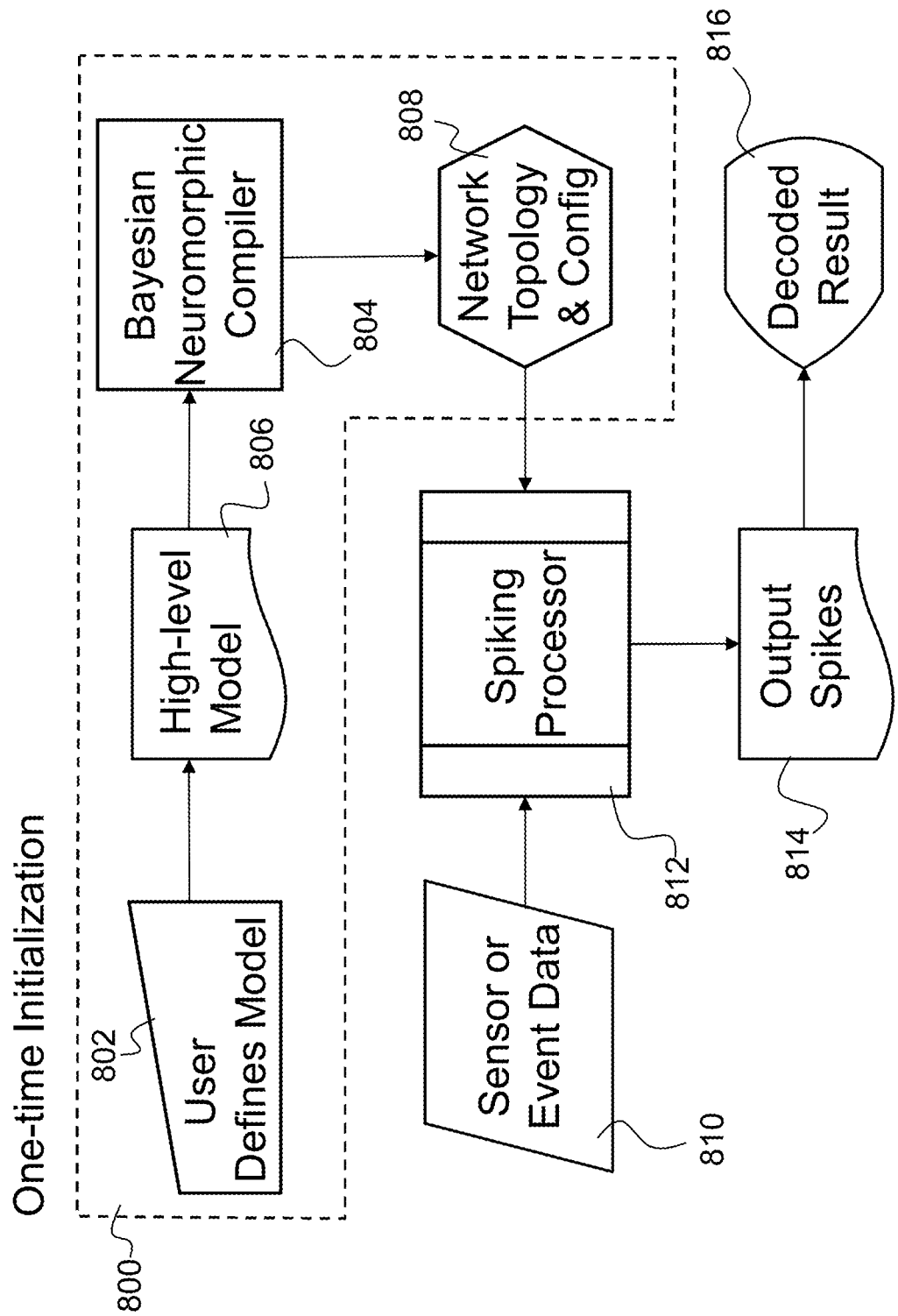
FIG. 8 is a flow diagram illustrating a system for automatically translating Bayesian network models into neuromorphic computing models according to some embodiments of the present disclosure.

The system and method described herein can be implemented as a multi-step process beginning with learning of the underlying model, or DAG, followed by specific queries supported by that learning (e.g., P(5|1) in FIG. 7B). The steps proceed as follows.
1. (Optional) Learn underlying model by feeding in known observations from historical data (FIG. 7A, where each numbered circle represents a variable (e.g., variable 3 (element 700)).
2. Provided a learned or specified model, any pair of variables may be queried for conditional probability, provided there is a directed path in the model (FIG. 7B, top).
3. By running the algorithm above, a neuromorphic structure can be built which computes the desired conditional (FIG. 7B, bottom). FIG. 7B shows the output of the readout network corresponding to the query P(5|1). FIG. 8 depicts the end-to-end system in which the method is applied.

As shown in FIG. 8, in a one-time initialization (element 800), a user defines (element 802) or specifies a Bayesian network model. The Bayesian Neuromorphic Compiler (element 804) takes as input the high-level Bayesian network model (element 806), or particular computation thereon, and produces a spiking neural network topology and configuration (element 808) that implements that model or computation. Given the spiking neural network topology and configuration (element 808) and sensor or event data (element 810), a spiking processor (element 812) performs Bayesian computations and outputs spikes (element 814), which are then transformed into decoded results (element 816), which can be utilized by, for instance, an autonomous mobile platform. Non-limiting examples of sensor data include temperature and acceleration. Non-limiting examples of event data include occurrences of error messages or state change times.

The invention according to embodiments of the present disclosure can be applied to any program that requires learning of or computing over discrete-valued, dynamic, directed, acyclic Bayesian network models. Non-limiting examples of applications include autonomous driving and fault diagnostics. By targeting efficient and scalable neural systems, the invention described herein has particular benefit for mobile, autonomous, and power-constrained platforms. For instance, the system described herein can be incorporated into mobile autonomous platforms (e.g., drones, unmanned aerial vehicles (UAVs)) and autonomous vehicles).

Probabilistic neuronal computation of the type described herein results in lower power and higher speed inferences, making it easily transition to various Size, Weight and Power (SWaP) constrained platforms of interest to vehicle manufacturers and government agencies. Non-limiting examples of these are autonomous systems (i.e., autonomous mobile platforms) for ground, aerial, and underwater vehicles and vehicle health diagnostics and prognostics (e.g., sensory and fault modalities, structure learning of maintenance messages). Additionally, adaptive mission planning for autonomous underwater vehicles (AUVs) and unmanned aerial vehicles (UAVs) via scenario and behavior understanding. Further commercial applications include portable medical diagnostics machines.

Complex systems, such as aircrafts or other vehicles, often record maintenance and fault messages from a few thousand different sources, including various sensor types. The occurrence of these messages over time can be treated as a random process corresponding to an input spike train. The spiking neural network topology and configuration according to embodiments of the present disclosure can be used to determine which of these message sources are highly dependent on which other sources (diagnostics) during Mode 1 ("learning"), and, in turn, be used for prognostics (e.g., if see fault X occur, what is the updated likelihood of seeing fault Y?) during Mode 2 ("readout"). For instance, if a fault is detected in one mechanical vehicle component (e.g., engine, brakes, steering mechanism, tire) that is associated with another mechanical vehicle component (e.g., engine, brakes, steering mechanism, tire), then an alert can be generated for the user. The alert can be an audible alert (e.g., beep, tone, voice) and/or a visual alert displayed on a screen/dashboard of the vehicle. The visual alert can be a signal light or a textual message. Alternatively, the alert can be a warning message or instructions to the vehicle operator (e.g., driver, pilot) indicating a vehicle component malfunction with detailed instructions regarding an operation to perform (e.g., power off the vehicle, perform a steering operation, perform a braking operation, obtain mechanical service) or, in other aspects, the system can initiate and be caused to perform the specified operation (such as powering off the vehicle or causing the vehicle to steer, etc.). Furthermore, a new conditional probability between a first input data stream from a first vehicle sensor and a third input data stream obtained from a third vehicle sensor can be determined based on the learned conditional probability between a first and second input data stream from first and second vehicle sensors.

In addition, in a non-limiting example of an autonomous mobile platform having multiple sensors, such as cameras. Based on the likelihood of one sensor detecting an object and/or obtaining sensor measurement data that is conditional on or related to another sensor detecting an object and/or obtaining a sensor measurement data, the system can cause the autonomous vehicle to perform a vehicle operation. For instance, if two vehicle sensors detect the same object, object detection and classification accuracy is increased and the system described herein can cause a precise vehicle maneuver for collision avoidance by controlling a vehicle component. For example, if the object is a stop sign, the system may cause the autonomous vehicle to apply a functional response or maneuvering operation, such as a braking operation to stop the vehicle. Other appropriate responses may include one or more of a steering operation, a throttle operation to increase speed or to decrease speed, or a decision to maintain course and speed without change. The responses may be appropriate for avoiding a collision, improving travel speed, or improving efficiency.

Figure 9:
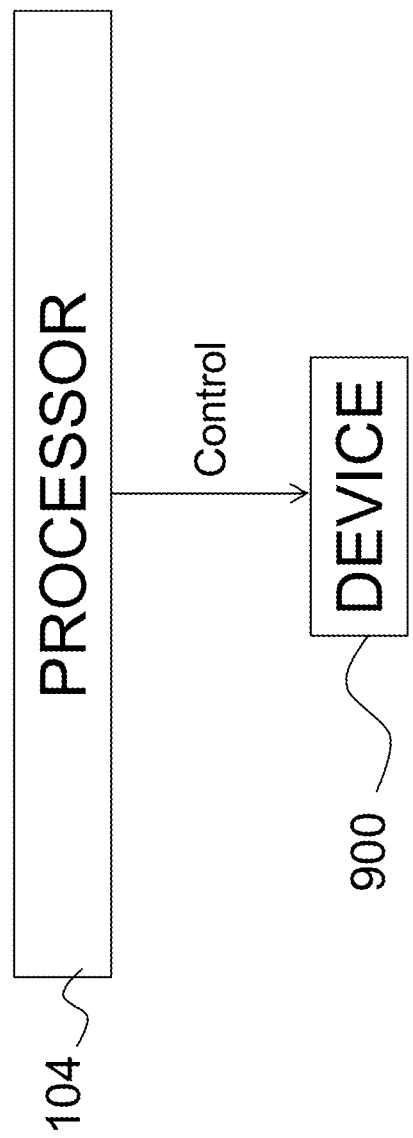
FIG. 9 is an illustration of a device being controlled based on a computed conditional probability according to some embodiments of the present disclosure.

FIG. 9 is a flow diagram illustrating using a processor 104 to control a autonomous mobile device 900 based on the determined conditional probability of two variables. Non-limiting examples of autonomous mobile devices 900 that can be controlled via the processor 104 include a vehicle or a vehicle component, such as a brake, a steering mechanism, suspension, or safety device (e.g., airbags, seatbelt tensioners, etc.). Further, the vehicle could be an unmanned aerial vehicle (UAV), an autonomous ground vehicle, or a human operated vehicle controlled either by a driver or by a remote operator. As can be appreciated by one skilled in the art, control of other device types is also possible.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

The invention claimed is:

1. A system for specifying control of a device based on a Bayesian network model, the system comprising:
a Bayesian neuromorphic compiler, having a network composition module comprising a plurality of probabilistic computation units (PCUs) arranged in a hierarchical composition containing multi-level dependencies, embodied on a non-transitory computer-readable medium, the Bayesian neuromorphic compiler comprising instructions to cause one or more processors to perform operations of:
receiving a Bayesian network model as input;
producing a spiking neural network topology and configuration that implements the Bayesian network model; and
using the network composition module, learning conditional probabilities of the Bayesian network model;
computing at least one conditional probability; and
controlling a device based on the at least one computed conditional probability.

2. The system as set forth in claim 1, wherein controlling the device includes causing the device to perform a maneuvering operation based on the at least one computed conditional probability.

3. The system as set forth in claim 2, wherein the device is an autonomous mobile platform, and the maneuvering operation is a collision avoidance operation.

4. The system as set forth in claim 1, wherein the PCUs are neuromorphic computing circuits configured to compute conditional probabilities.

5. The system as set forth in claim 1, wherein the network composition module arranges the plurality of PCUs such that it learns the conditional probabilities of the Bayesian network model and, subsequently, infers at least one conditional probability pertaining to a query for the Bayesian network model.

6. A computer implemented method for specifying control of a device based on a Bayesian network model, the method comprising acts of:
using a Bayesian neuromorphic compiler having a network composition module comprising a plurality of probabilistic computation units (PCUs) arranged in a hierarchical composition containing multi-level dependencies, embodied on a non-transitory computer-readable medium, the Bayesian neuromorphic compiler comprising instructions to cause one or more processors to perform operations of:
receiving a Bayesian network as input;
producing a spiking neural network topology and configuration that implements the Bayesian network model;
using the network composition module, learning conditional probabilities of the Bayesian network model;
computing at least one conditional probability; and
controlling a device based on the at least one computed conditional probability.

7. The method as set forth in claim 6, wherein controlling the device includes causing the device to perform a maneuvering operation based on the at least one computed conditional probability.

8. The method as set forth in claim 7, wherein the device is an autonomous mobile platform, and the maneuvering operation is a collision avoidance operation.

9. The method as set forth in claim 6, wherein the PCUs are neuromorphic computing circuits configured to compute conditional probabilities.

10. The method as set forth in claim 6, wherein the network composition module arranges the plurality of PCUs such that it learns the conditional probabilities of the Bayesian network model and, subsequently, infers at least one conditional probability pertaining to a query for the Bayesian network model.

11. A computer program product for specifying control of a device based on a Bayesian network model, the computer program product comprising:
a Bayesian neuromorphic compiler, having a network composition module comprising a plurality of probabilistic computation units (PCUs) arranged in a hierarchical composition containing multi-level dependencies, embodied on a non-transitory computer-readable medium, the Bayesian neuromorphic compiler comprising instructions to cause one or more processors to perform operations of:
receiving a Bayesian network model as input;
producing a spiking neural network topology and configuration that implements the Bayesian network model; and
using the network composition module, learning conditional probabilities of the Bayesian network model;
computing at least one conditional probability; and
controlling a device based on the at least one computed conditional probability.

12. The computer program product as set forth in claim 11, wherein controlling the device includes causing the device to perform a maneuvering operation based on the at least one computed conditional probability.

13. The computer program product as set forth in claim 12, wherein the device is an autonomous mobile platform, and the maneuvering operation is a collision avoidance operation.

14. The computer program product as set forth in claim 11, wherein the PCUs are neuromorphic computing circuits configured to compute conditional probabilities.

15. The computer program product as set forth in claim 11, wherein the network composition module arranges the plurality of PCUs such that it learns the conditional probabilities of the Bayesian network model and, subsequently, infers at least one conditional probability pertaining to a query for the Bayesian network model.

* * * * *